US012638047B2

(12) United States Patent
Chen et al.

(10) Patent No.: US 12,638,047 B2
(45) Date of Patent: May 26, 2026

(54) SLIDE RAIL ASSEMBLY

(71) Applicants:King Slide Works Co., Ltd., Kaohsiung City (TW); King Slide Technology Co., Ltd., Kaohsiung City (TW)

(72) Inventors: Ken-Ching Chen, Kaohsiung City (TW); Shun-Ho Yang, Kaohsiung City (TW); Chih-Hsin Yeh, Kaohsiung City (TW); Chun-Chiang Wang, Kaohsiung City (TW)

(73) Assignees: King Slide Works Co., Ltd., Kaohsiung City (TW); King Slide Technology Co., Ltd., Kaohsiung City (TW)

( * ) Notice: Subject to any disclaimer, the term of this patent is extended or adjusted under 35 U.S.C. 154(b) by 70 days.

(21) Appl. No.: 18/805,515

(22) Filed: Aug. 14, 2024

(65) Prior Publication Data

US 2025/0188987 A1      Jun. 12, 2025

(30) Foreign Application Priority Data

Dec. 11, 2023    (TW) ................................. 112148384

(51) Int. Cl.
*A47B 88/493*        (2017.01)
*F16C 29/00*        (2006.01)
*F16C 29/04*        (2006.01)
(52) U.S. Cl.
CPC ............ *F16C 29/005* (2013.01); *F16C 29/04* (2013.01)

(58) Field of Classification Search
CPC ............ A47B 88/493; A47B 2210/007; A47B 2210/0081; F16C 29/005; F16C 29/04
USPC .................................... 312/330.1, 334.1, 333
See application file for complete search history.

(56) References Cited

U.S. PATENT DOCUMENTS

| | | | |
|---|---|---|---|
| 3,801,116 A * | 4/1974 | Benner | ................... A63C 5/12 |
| | | | 280/610 |
| 5,671,988 A | 9/1997 | O'Neill | |
| 6,820,954 B2 * | 11/2004 | Judge | ................... H05K 7/1489 |
| | | | 312/334.46 |
| 6,851,773 B2 | 2/2005 | Chen et al. | |
| 7,648,214 B2 | 1/2010 | Chen et al. | |
| 7,878,607 B2 * | 2/2011 | Huang | ................. A47B 88/487 |
| | | | 312/334.46 |

(Continued)

FOREIGN PATENT DOCUMENTS

| | | |
|---|---|---|
| CA | 2177246 C | 8/1999 |
| DE | 202006006344 U1 | 7/2006 |

*Primary Examiner* — James O Hansen
(74) *Attorney, Agent, or Firm* — Best & Flanagan LLP

(57) ABSTRACT

A slide rail assembly includes a first rail, a second rail and a slide assisting device. The slide assisting device is movably mounted between the first rail and the second rail. One of the first rail and the slide assisting device is arranged with an elastic member having a first engaging feature. The other one of the first rail and the slide assisting device is arranged with a second engaging feature. The first engaging feature and the second engaging feature are configured to be engaged with each other in order to prevent the slide assisting device from being moved from a predetermined position. The second rail includes at least one auxiliary part configured to disengage the first engaging feature and the second engaging feature from each other.

16 Claims, 8 Drawing Sheets

(56) References Cited

U.S. PATENT DOCUMENTS

| | | | |
|---|---|---|---|
| 8,752,917 B1 * | 6/2014 | Chang .................. | A47B 88/487 |
| | | | 312/334.47 |
| 2002/0081887 A1 * | 6/2002 | Judge ................... | H05K 7/1489 |
| | | | 439/348 |
| 2008/0129170 A1 * | 6/2008 | Peng .................... | A47B 88/493 |
| | | | 312/334.44 |

* cited by examiner

SLIDE RAIL ASSEMBLY

BACKGROUND OF THE INVENTION

1. Field of the Invention

The present invention relates to a slide rail mechanism, and more particularly, to a slide rail assembly capable of improving reliability of a slide assisting device between two slide rails.

2. Description of the Prior Art

U.S. Pat. No. 6,851,773 B2 discloses a track device for a drawer. The track device includes a first track, a second track, a slide-adding member, a retaining member and an unlatching member. The slide-adding member is movably mounted between the first track and the second track. The retaining member is arranged on the first track. The unlatching member is arranged on the second track. When the second track detached from the first track is reinserted into the first track, the second track can abut against a hook part of the retaining member through an inclined surface at the rear end of the unlatching member, such that a resilient hook rod of the retaining member can be elastically moved to disengage a hook part on the resilient hook rod and a hook of the slide-adding member from each other.

However, for different market requirements, it is important to develop various slide rail products.

SUMMARY OF THE INVENTION

The present invention provides a slide rail assembly capable of improving reliability of a slide assisting device between two slide rails.

According to an embodiment of the present invention, a slide rail assembly comprises a first rail, a second rail and a slide assisting device. The first rail is formed with a passage. The second rail is longitudinally movable relative to the first rail. The slide assisting device is movably mounted between the first rail and the second rail. One of the first rail and the slide assisting device is arranged with an elastic member having a first engaging feature, and the other one of the first rail and the slide assisting device is arranged with a second engaging feature. The first engaging feature and the second engaging feature are configured to be engaged with each other in order to prevent the slide assisting device from being moved from a first predetermined position along a retracting direction. The second rail comprises an auxiliary part and a driving part. When the second rail detached from the passage of the first rail is reinserted into the passage of the first rail along the retracting direction, the second rail is configured to contact the elastic member through the auxiliary part, in order to move the elastic member to switch from a first state to a second state, so as to disengage the first engaging feature and the second engaging feature from each other. When the second rail is further moved along the retracting direction, the driving part is configured to contact a predetermined feature on the slide assisting device, in order to drive the slide assisting device to move away from the first predetermined position along the retracting direction.

According to another embodiment of the present invention, a slide rail assembly comprises a first rail, a first rail and a slide assisting device. The first rail is formed with a passage. The slide assisting device is located inside the passage of the first rail. One of the first rail and the slide assisting device is arranged with an elastic member having a first engaging feature, the other one of the first rail and the slide assisting device is arranged with a second engaging feature. The first engaging feature and the second engaging feature are configured to be engaged with each other in order to prevent the slide assisting device from being moved from a first predetermined position along a retracting direction. The second rail comprises an auxiliary part and a driving part. When the second rail is inserted into the passage of the first rail from outside of the passage of the first rail along the retracting direction, the second rail is configured to contact the elastic member through the auxiliary part, in order to move the elastic member to switch from a first state to a second state, so as to disengage the first engaging feature and the second engaging feature from each other. When the second rail is further moved along the retracting direction, the driving part is configured to contact a predetermined feature on the slide assisting device, in order to drive the slide assisting device to move away from the first predetermined position along the retracting direction. The slide rail assembly further comprises a third rail, and the first rail is movably mounted between the third rail and the second rail. The slide rail assembly further comprises a working member arranged on the first rail, and a predetermined structure is arranged on the second rail. During a process of the second rail being moved relative to the first rail from a retracted position along an opening direction, the working member and the predetermined structure are configured to be engaged with each other, such that the first rail is configured to be synchronously moved with the second rail relative to the third rail along the opening direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
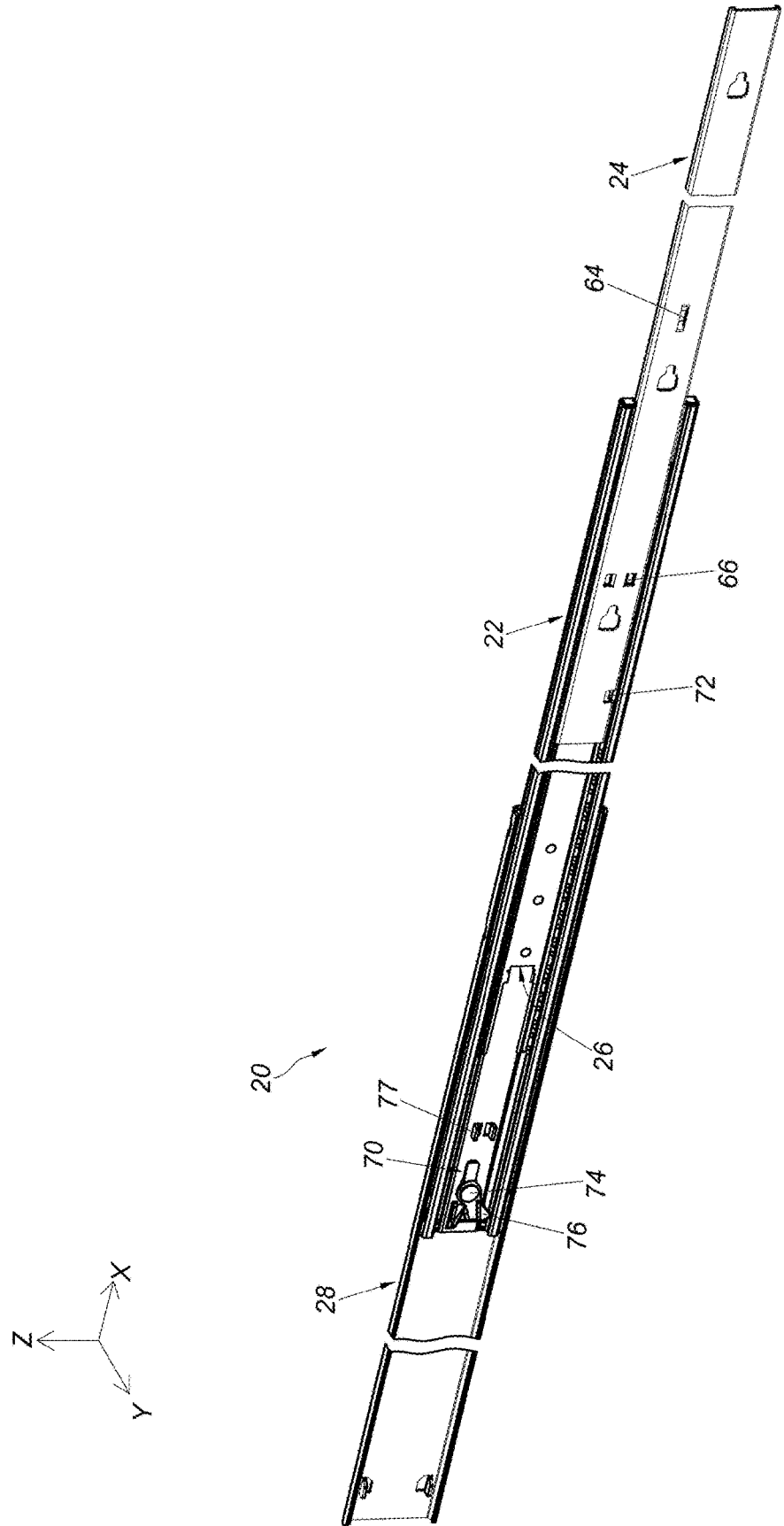
FIG. 1 is a diagram showing a slide rail assembly according to an embodiment of the present invention.
Figure 2:
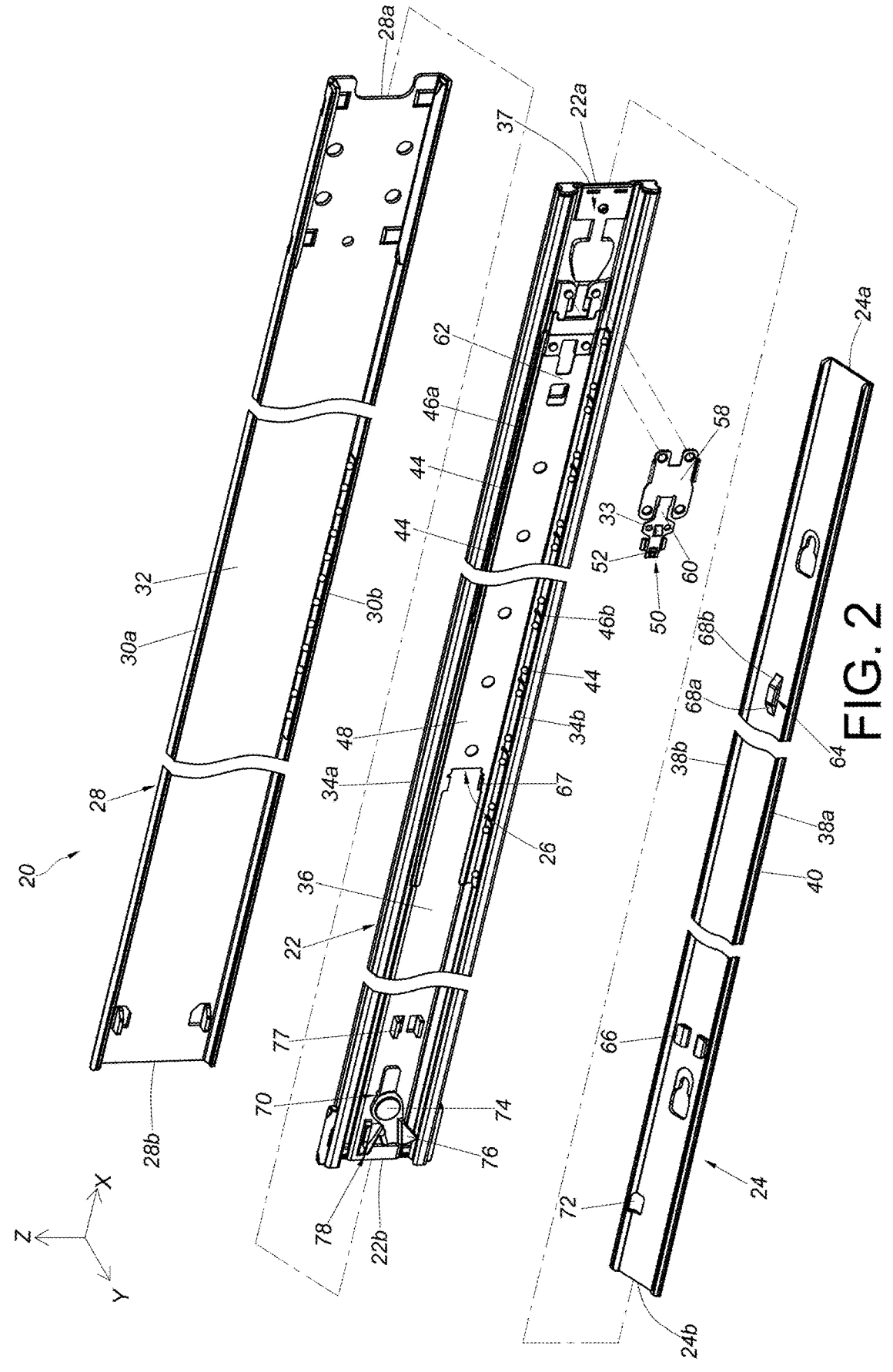
FIG. 2 is an exploded view of the slide rail assembly comprising a first rail, a second rail and a third rail according to the embodiment of the present invention.

As shown in FIG. 1 and FIG. 2, a slide rail assembly 20 comprises a first rail 22, a second rail 24 and a slide assisting device 26 according to an embodiment of the present invention. Preferably, the slide rail assembly 20 further comprises a third rail 28. The first rail 22 (such as a middle rail) is movably mounted between the third rail 28 (such as an outer rail) and the second rail 24 (such as an inner rail). The first rail 22, the second rail 24 and the third rail 28 are longitudinally movable relative to each other. In the present embodiment, the X axis is a longitudinal direction (or a length direction or a moving direction of the slide rail), the Y axis is a transverse direction (or a lateral direction of the slide rail), and the Z axis is a vertical direction (or a height direction of the slide rail).

The third rail 28 has a first end part 28a and a second end part 28b opposite to each other, such as a front end part and a rear end part, but the present invention is not limited thereto. The third rail 28 comprises a first wall 30a, a second wall 30b and a longitudinal wall 32 connected between the first wall 30a and the second wall 30b of the third rail 28. An auxiliary passage is defined by the first wall 30a, the second wall 30b and the longitudinal wall 32 of the third rail 28 and configured to accommodate the first rail 22. An inner side of each of the first wall 30a and the second wall 30b of the third rail 28 is arranged with a ball rolling bar configured to support the first rail 22 for improving sliding smoothness.

The first rail 22 has a first end part 22a and a second end part 22b opposite to each other, such as a front end part and a rear end part, but the present invention is not limited thereto. The first rail 22 comprises a first wall 34a, a second wall 34b and a longitudinal wall 36 connected between the first wall 34a and the second wall 34b of the first rail 22. A passage 37 is defined by the first wall 34a, the second wall 34b and the longitudinal wall 36 of the first rail 22 and configured to accommodate the second rail 24.

The second rail 24 has a first end part 24a and a second end 24b part opposite to each other, such as a front end part and a rear end part, but the present invention is not limited thereto. The second rail 24 comprises a first wall 38a, a second wall 38b and a longitudinal wall 40 connected between the first wall 38a and the second wall 38b of the second rail 24.

The slide assisting device 26 is movably mounted between the first rail 22 and the second rail 24. Specifically, the passage 37 of the first rail 22 is configured to accommodate the slide assisting device 26 and the second rail 24. Preferably, the slide assisting device 26 comprises a plurality of rolling members 44 (such as balls) configured to provide support between the first rail 22 and the second rail 24 in order to improve smoothness of relative movement between the first rail 22 and the second rail 24. The slide assisting device 26 comprises a first side part 46a, a second side part 46b and a longitudinal part 48 connected between the first side part 46a and the second side part 46b. Each of the first side part 46a and the second side part 46b is arranged with the plurality of rolling members 44.

Figure 3:
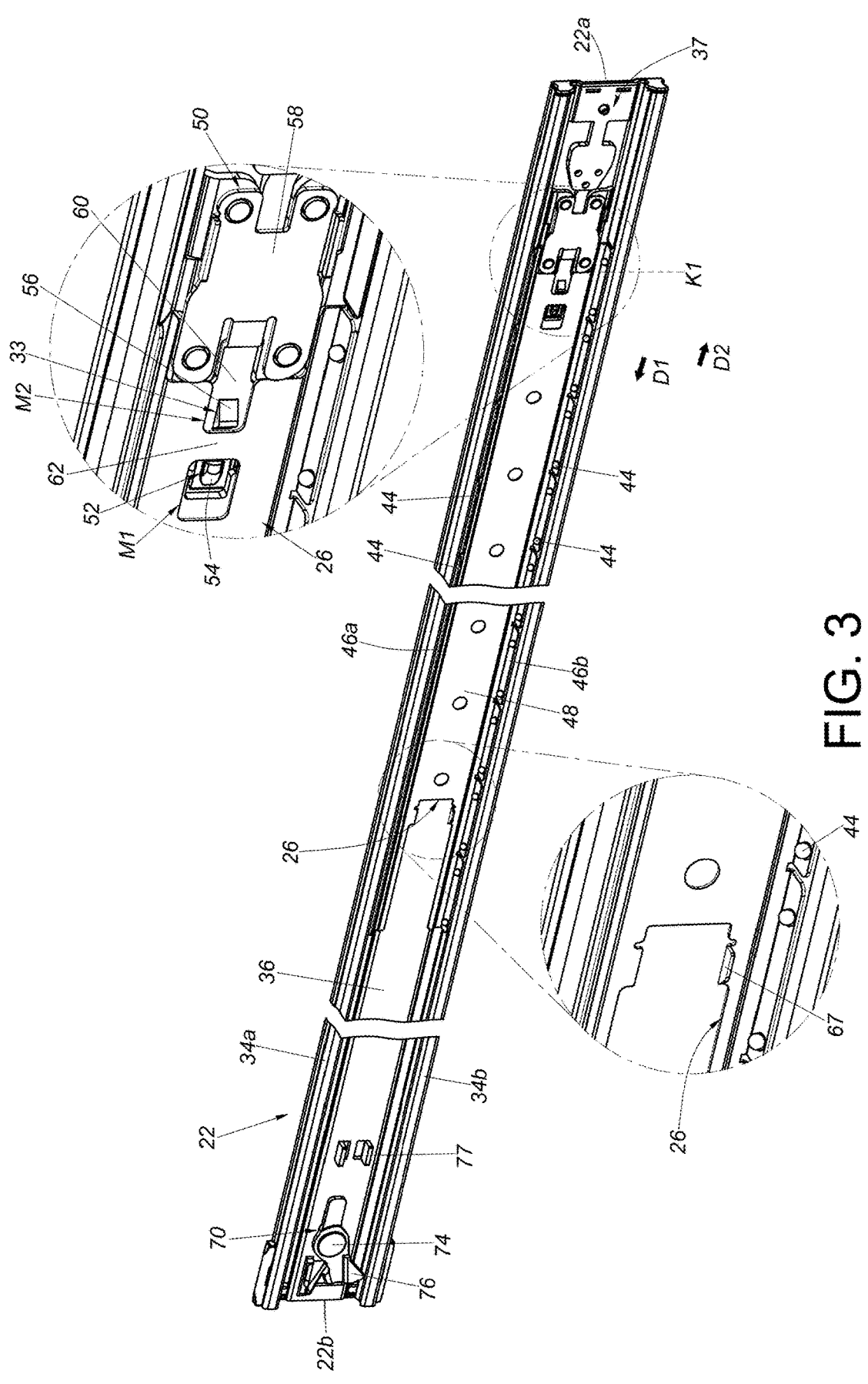
FIG. 3 is a diagram showing a slide assisting device located at a first predetermined position to be engaged with the first rail according to an embodiment of the present invention.

As shown in FIG. 2 and FIG. 3, one of the first rail 22 and the slide assisting device 26 is arranged with an elastic member 50. In the present embodiment, the elastic member 50 is connected to the first rail 22 (the longitudinal wall 36 of the first rail 22), and the elastic member 50 has a first engaging feature 52. Moreover, the elastic member 50 further has an engaging structure 33 adjacent to the first engaging feature 52, and a predetermined space is defined between the first engaging feature 52 and the engaging structure 33. The first engaging feature 52 and the engaging structure 33 are respectively arranged with a first guiding section 54 and a second guiding section 56 at positions far away from each other (as shown in FIG. 3). Each of the first guiding section 54 and the second guiding section 56 has an arc surface or an inclined surface, but the present invention is not limited thereto.

Preferably, the elastic member 50 comprises a connecting part 58 and an elastic part 60. The connecting part 58 is connected (such as fixedly connected) to the first rail 22 (the longitudinal wall 36 of the first rail 22), and the elastic part 60 is extended from the connecting part 58.

Preferably, the first engaging feature 52 and the engaging structure 33 are arranged on the elastic part 60 of the elastic member 50. Both the first engaging feature 52 and the engaging structure 33 are protrusions, but the present invention is not limited thereto.

The other one of the first rail 22 and the slide assisting device 26 is arranged with a second engaging feature 62. In the present embodiment, the slide assisting device 26 is arranged with the second engaging feature 62. The first engaging feature 52 and the second engaging feature 62 are configured to be engaged with each other in order to prevent the slide assisting device 26 from being moved from a first predetermined position K1 along a retracting direction D1 relative to the first rail 22 (as shown in FIG. 3).

Preferably, when the slide assisting device 26 is located at the first predetermined position K1, the slide assisting device 26 is adjacent to the first end part 22a of the first rail 22.

Preferably, when the slide assisting device 26 is located at the first predetermined position K1, the second engaging feature 62 is engaged between the first engaging feature 52 and the engaging structure 33, such that the slide assisting device 26 is prevented from being moved from the first predetermined position K1 along the retracting direction D1 or an opening direction D2 relative to the first rail 22 (as shown in FIG. 3).

Preferably, the slide assisting device 26 is formed with a first working space M1 and a second working space M2, and the second engaging feature 62 is located between the first working space M1 and the second working space M2. When the slide assisting device 26 is located at the first predetermined position K1, the first working space M1 and the second working space M2 correspond to the first engaging feature 52 and the engaging structure 33 respectively.

Preferably, the slide assisting device 26 further comprises a predetermined feature 67, and the predetermined feature 67 is a bent section or a protruded section, but the present invention is not limited thereto.

The second rail 24 comprises an auxiliary part 64 and a driving part 66 (as shown in FIG. 2), and the auxiliary part 64 and the driving part 66 are separated from each other by a predetermined longitudinal distance along the longitudinal direction. Compared with the driving part 66, the auxiliary part 64 is closer to the first end part 24a of the second rail 24. In other words, the driving part 66 is farther away from the first end part 24a of the second rail 24.

Preferably, the auxiliary part 64 is arranged with a first guiding feature 68a and a second guiding feature 68b opposite to each other, and each of the first guiding feature 68a and the second guiding feature 68b has an arc surface or an inclined surface, but the present invention is not limited thereto.

Preferably, both the auxiliary part 64 and the driving part 66 are protrusions, but the present invention is not limited thereto.

Figure 4:
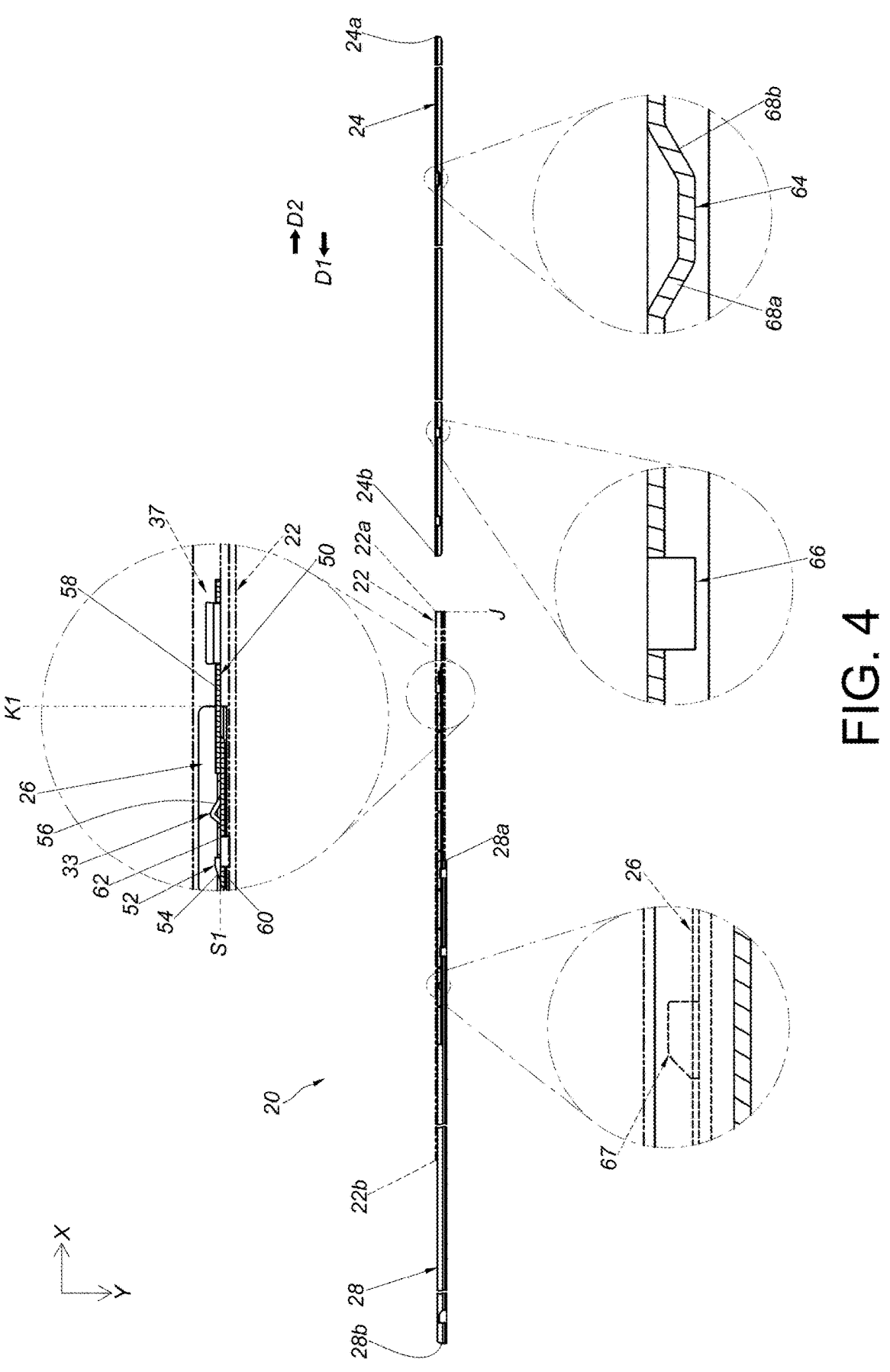
FIG. 4 is a diagram showing the first rail located at an opening position relative to the third rail with the second rail being detached from a passage of the first rail according to the embodiment of the present invention.

As shown in FIG. 4, the first rail 22 is located at an opening position J relative to the third rail 28. Preferably, the first rail 22 is configured to be held at the opening position J through a positioning mechanism. In addition, the second rail 24 is able to be detached from the passage 37 of the first rail 22 along the opening direction D2, such that the second rail 24 can be located outside the passage 37 of the first rail 22. Such configuration is well known to those skilled in the art, no further illustration is provided for simplification.

Moreover, when the second rail 24 is detached from the passage 37 of the first rail 22 along the opening direction D2, the slide assisting device 26 is configured to be moved to the first predetermined position K1 along the opening direction D2 relative to the first rail 22, and the second engaging feature 62 of the slide assisting device 26 is configured to be engaged between the first engaging feature 52 and the engaging structure 33. The first engaging feature 52 and the second engaging feature 62 are configured to be engaged with each other to prevent the slide assisting device 26 from being moved from the first predetermined position K1 along the retracting direction D1.

Figure 5:
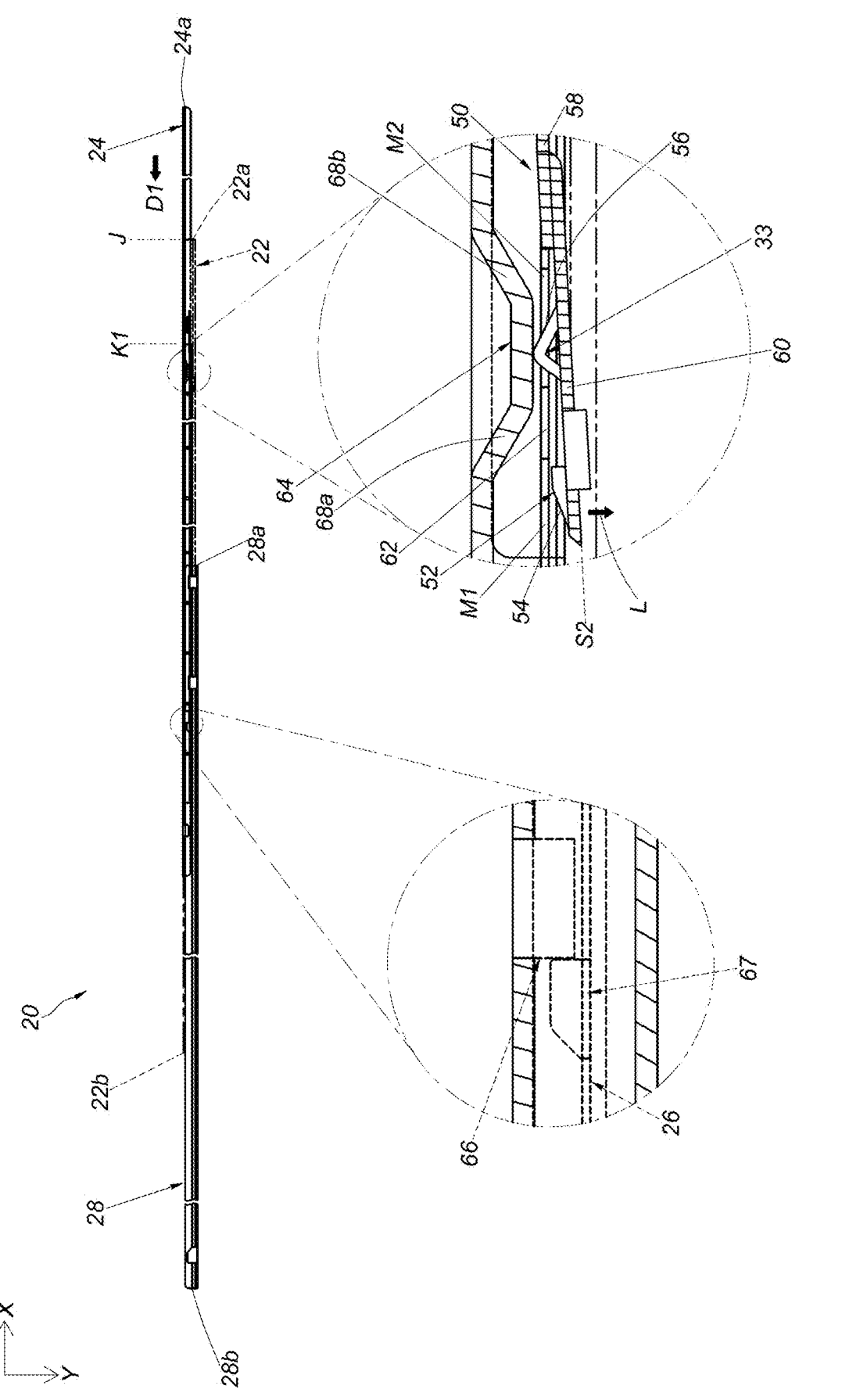
FIG. 5 is a diagram showing the first rail located at the opening position relative to the third rail with the second rail being inserted into the passage of the first rail along a retracting direction according to the embodiment of the present invention.

As shown in FIG. 4 and FIG. 5, when the second rail 24 detached from the passage 37 of the first rail 22 is reinserted into the passage 37 of the first rail 22 along the retracting direction D1, the second rail 24 is configured to contact (or press) the elastic member 50 (the engaging structure 33 of the elastic member 50) through one of the auxiliary part 64 and the driving part 66 (such as the auxiliary part 64), in order to move (or deflect) the elastic member 50 (the elastic part 60 of the elastic member 50) along a predetermined direction L to switch from a first state S1 (an engaged state as shown in FIG. 4) to a second state S2 (a disengaged state as shown in FIG. 5), such that the first engaging feature 52 and the second engaging feature 62 are disengaged from each other (for example, the first engaging feature 52 and the second engaging feature 62 are transversely offset from each other without blocking each other along the longitudinal direction). As such, when the second rail 24 is further moved along the retracting direction D1, the other one of the auxiliary part 64 and the driving part 66 (such as the driving part 66) is configured to contact the predetermined feature 67 on the slide assisting device 26, in order to drive (such as push) the slide assisting device 26 to move away from the first predetermined position K1 along the retracting direction D1.

Therefore, according to the embodiment of the present invention, the auxiliary part 64 is configured to contact the elastic member 50 (the engaging structure 33 of the elastic member 50) to move the elastic member 50 (the elastic part 60 of the elastic member 50) to switch from the first state S1 (as shown in FIG. 4) to the second state S2 (as shown in FIG. 5), in order to disengage the first engaging feature 52 and the engaging locking feature 62 from each other. Moreover, the driving part 66 is configured to contact the predetermined feature 67 on the slide assisting device 26 to forcibly drive (such as push) the slide assisting device 26 to move away from the first predetermined position K1 along the retracting direction D1, thereby it can ensure that the slide assisting device 26 can be moved from the first predetermined position K1 along the retracting direction D1.

Preferably, during a process of the second rail 24 being inserted into the passage 37 of the first rail 22 along the retracting direction D1, the auxiliary part 64 is configured to abut against the second guiding section 56 of the engaging structure 33 through the first guiding feature 68a, in order to move the elastic part 60 of the elastic member 50 to switch from the first state S1 (as shown in FIG. 4) to the second state S2 (as shown in FIG. 5).

Figure 6:
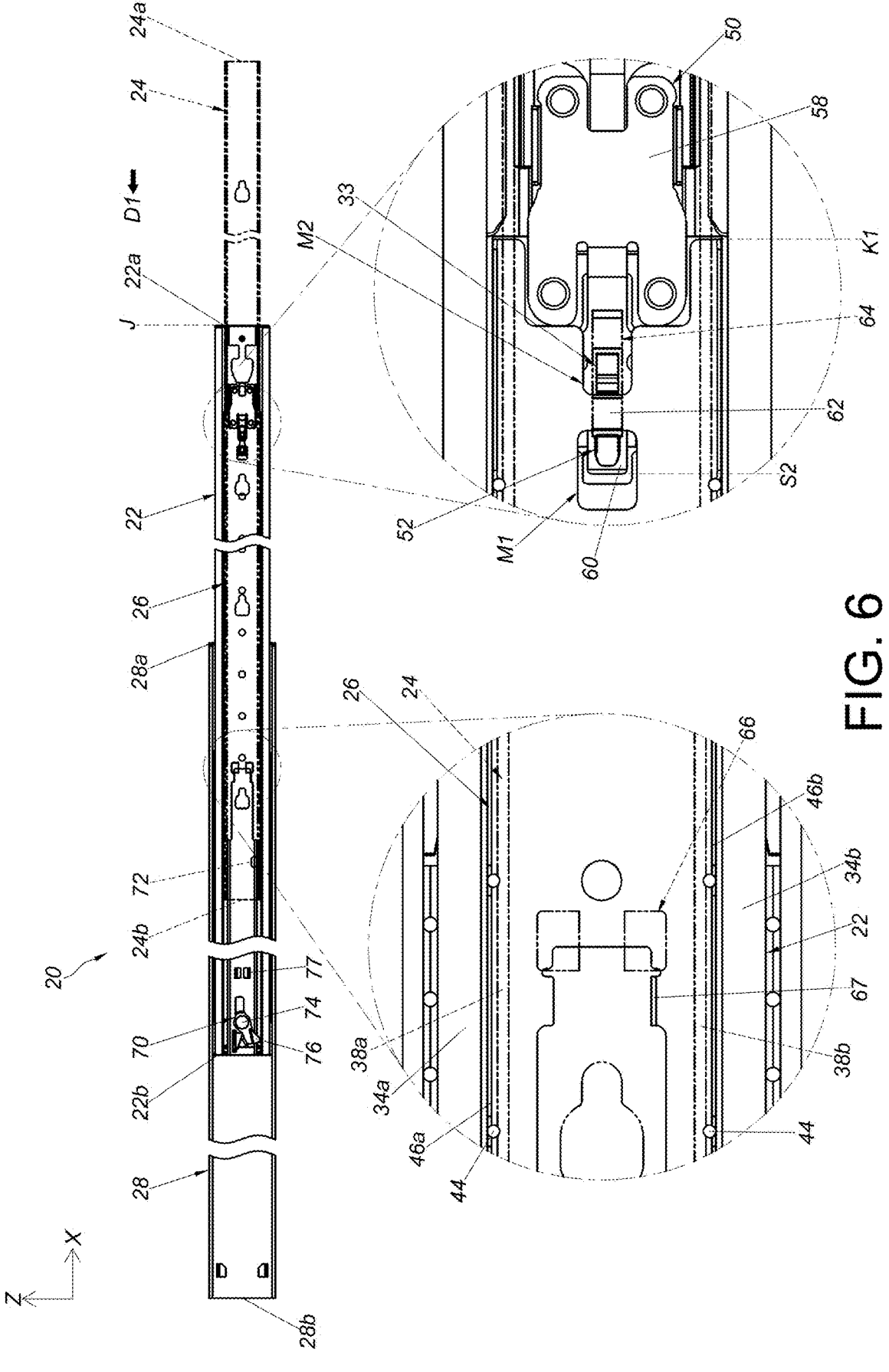
FIG. 6 is a diagram showing the first rail located at the opening position relative to the third rail with the second rail being inserted into the passage of the first rail along the retracting direction in another viewing angle according to the embodiment of the present invention.
Figure 7:
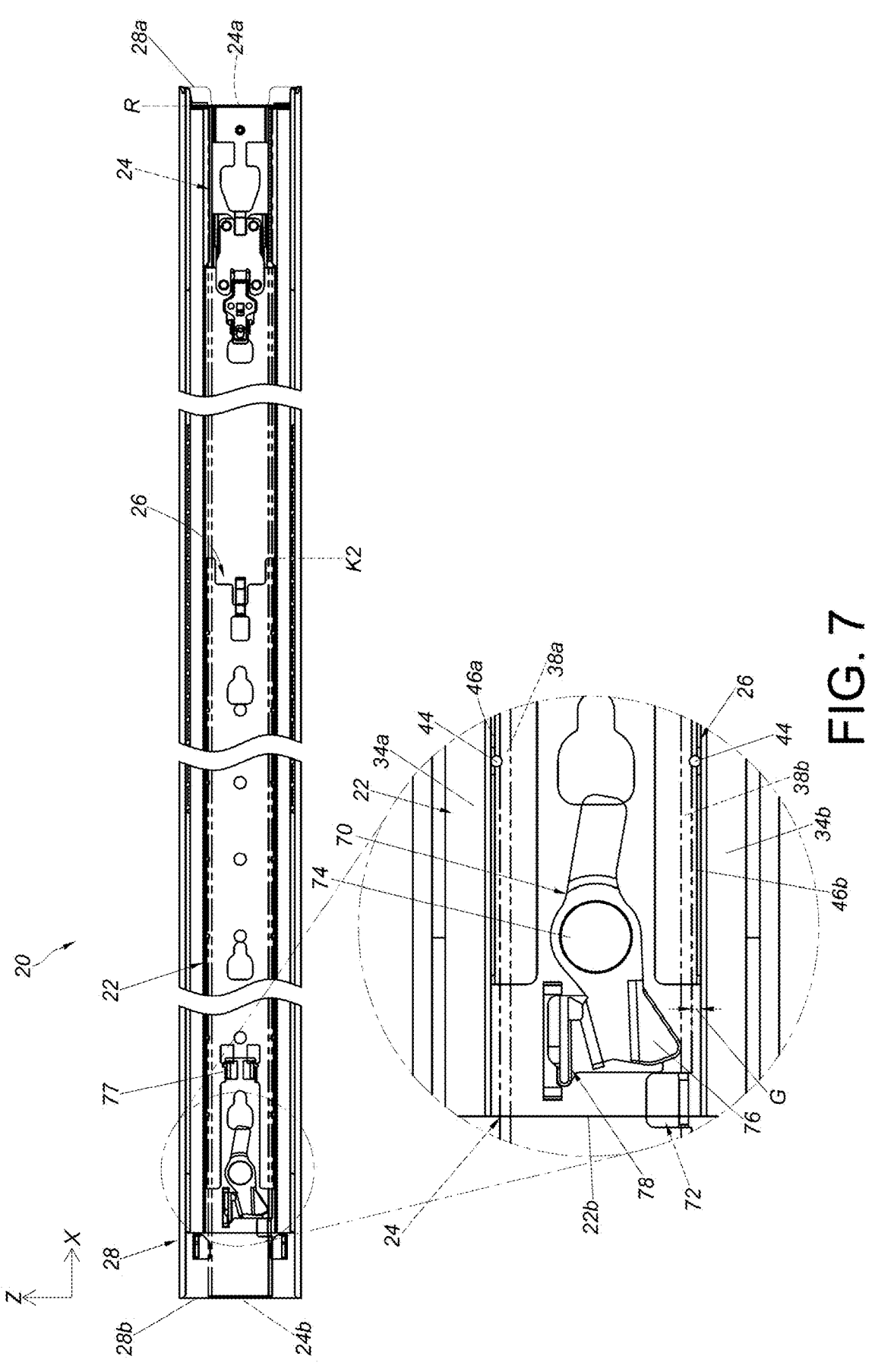
FIG. 7 is a diagram showing the slide rail assembly being in a retracted state according to the embodiment of the present invention.

As shown in FIG. 5, FIG. 6 and FIG. 7, the slide rail assembly 20 further comprises a working member 70 arranged on the first rail 22, and a predetermined structure 72 is arranged on the second rail 24 (as shown in FIG. 6, please also refer to FIG. 2). The predetermined structure 72 is configured to work with the working member 70. Preferably, the working member 70 is pivotally connected to the first rail 22 (the longitudinal wall 36 of the first rail 22) through a shaft member 74. The shaft member 74 is arranged in a direction substantially identical to the transverse direction (or the lateral direction of the first rail 22), or the Y-axis direction (please also refer to FIG. 2). The working member 70 comprises a working part 76. The predetermined structure 72 is formed with a space, such as an opening, but the present invention is not limited thereto. The predetermined structure 72 is located on or adjacent to the second wall 38b of the second rail 24. On the other hand, the rolling members 44 on the first side part 46a are configured to provide support between the first wall 34a of the first rail 22 and the first wall 38a of the second rail 24, and the rolling members 44 on the second side part 46b are configured to provide support between the second wall 34b of the first rail 22 and the second wall 38b of the second rail 24 (as shown in FIG. 6).

When the elastic part 60 of the elastic member 50 is in the second state S2 (as shown in FIG. 5 and FIG. 6), the slide assisting device 26 can be moved from the first predetermined position K1 along the retracting direction D1 to a second predetermined position K2, such that the slide assisting device 26 is adjacent to the second end part 22b of the first rail 22 (as shown in FIG. 7). Furthermore, when the second rail 24 (and the first rail 22) is located at a retracted position R relative to the third rail 28 and when the slide assisting device 26 is located at the second predetermined position K2, the slide rail assembly 20 is in a retracted state (such as a fully retracted state shown in FIG. 7). Since the slide assisting device 26 is located at the second predetermined position K2, the rolling members 44 of the slide assisting device 26 are configured to provide support between the first rail 22 and the second rail 24. For example, the rolling members 44 of the slide assisting device 26 are configured to provide support between the first wall 34a of the first rail 22 and the first wall 38a of the second rail 24, and to provide support between the second wall 34b of the first rail 22 and the second wall 38b of the second rail 24, so as to keep a predetermined gap G between the first rail 22 (the second wall 34b of the first rail 22) and the second rail 24 (the second wall 38b of the second rail 24) as shown in FIG. 7. As such, reliability of the predetermined structure 72 working with the working member 70 can be improved.

Preferably, the first rail 22 is further arranged with at least one blocking part 77. When the slide assisting device 26 is located at the second predetermined position K2, the blocking part 77 is configured to block the slide assisting device 26 in order to prevent the slide assisting device 26 from being further moved along the retracting direction D1.

Preferably, the slide rail assembly 20 further comprises an elastic feature 78 configured to provide an elastic force to the working member 70. When the second rail 24 is located at the retracted position R relative to the first rail 22 (or the third rail 28), the second wall 38b of the second rail 24 is configured support the working part 76 of the working member 70, and the elastic feature 78 is configured to accumulate a predetermined elastic force.

Figure 8:
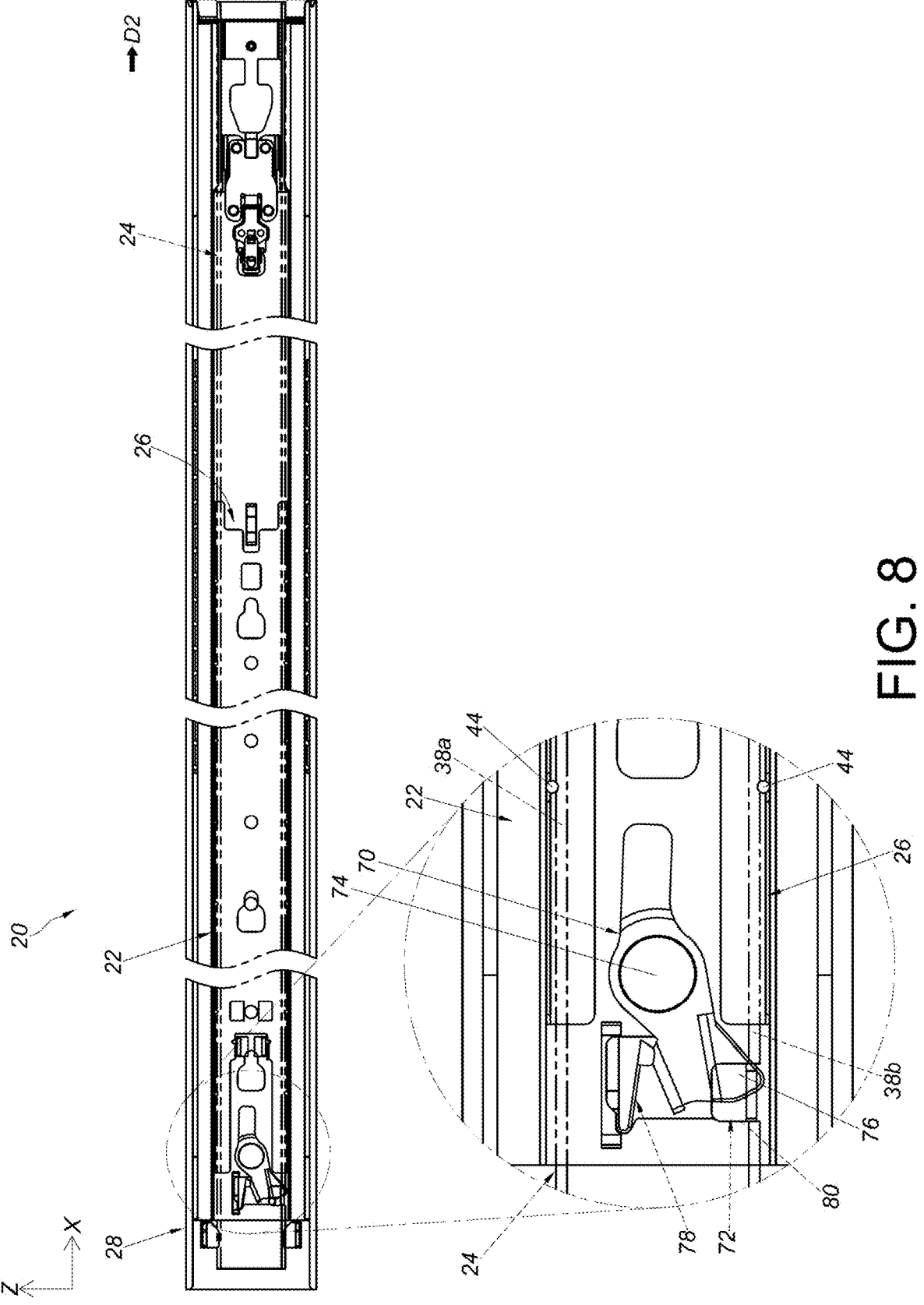
FIG. 8 is a diagram showing the second rail and the first rail configured to be synchronously moved relative to the third rail along an opening direction according to the embodiment of the present invention.

As shown in FIG. 8, during a process of the second rail 24 being moved relative to the first rail 22 (or the third rail 28) from the retracted position R along the opening direction D2, the working member 70 and the predetermined structure 72 are configured to be engaged with each other, such that the first rail 22 is configured to be synchronously moved with the second rail 24 relative to the third rail 28 along the opening direction D2.

Specifically, when the second rail 24 is moved a predetermined distance from the retracted position R along the opening direction D2 relative to the first rail 22 (or the third rail 28), the second wall 38*b* of the second rail 24 no longer supports the working part 76 of the working member 70, and the elastic feature 78 is configured to release the predetermined elastic force to drive the working member 70 to rotate, such that the working part 76 of the working member 70 is configured to enter the space provided by the predetermined structure 72. As such, the working part 76 of the working member 70 and the predetermined structure 72 are engaged with each other, in order to allow the second rail 24 and the first rail 22 to be synchronously moved along the opening direction D2 relative to the third rail 28 (a predetermined wall 80 of the predetermined structure 72 beside the space is configured to push the working part 76 of the working member 70 when the second rail 24 is moved along the opening direction D2).

Moreover, before the second rail 24 is detached from the passage 37 of the first rail 22 along the opening direction D2, the synchronous movement configuration between the second rail 24 and the first rail 22 can be disabled by a predetermined structure on the third rail 28. Such configuration is well known to those skilled in the art, no further illustration is provided for simplification.

Therefore, the slide rail assembly 20 according to the embodiment of the present invention has the following technical features:

1. When the second rail 24 detached from the passage 37 of the first rail 22 (as shown in FIG. 4) is reinserted into the passage 37 of the first rail 22 along the retracting direction D1 (as shown in FIG. 5), the second rail 24 is configured to contact the elastic member 50 (the engaging structure 33 of the elastic member 50) through the auxiliary part 64, in order to move the elastic member 50 (the elastic part 60 of the elastic member 50) to switch from the first state S1 (as shown in FIG. 4) to the second state S2 (as shown in FIG. 5), so as to disengage the first engaging feature 52 and the second engaging feature 62 from each other. Moreover, the driving part 66 of the second rail 24 is configured to contact the predetermined feature 67 on the slide assisting device 26 to forcibly drive the slide assisting device 26 to move away from the first predetermined position K1 along the retracting direction D1, thereby it can ensure that the slide assisting device 26 is moved away from the first predetermined position K1 along the retracting direction D1.

2. When the slide assisting device 26 is moved from the first predetermined position K1 along the retracting direction D1 to the second predetermined position K2, the rolling members 44 of the slide assisting device 26 are configured to provide support between the first rail 22 and the second rail 24. For example, the rolling members 44 of the slide assisting device 26 are configured to provide support between the first wall 34*a* of the first rail 22 and the first wall 38*a* of the second rail 24, and to provide support between the second wall 34*b* of the first rail 22 and the second wall 38*b* of the second rail 24, so as to keep the predetermined gap G between the first rail 22 (the second wall 34*b* of the first rail 22) and the second rail 24 (the second wall 38*b* of the second rail 24) as shown in FIG. 7. As such, the reliability of the predetermined structure 72 working with the working member 70 can be improved. For example, the stability or reliability of mutual engagement between the working member 70 and the predetermined structure 72 is improved, so as to allow the second rail 24 and the first rail 22 to be synchronously moved relative to the third rail 28 along the opening direction D2.

3. The slide assisting device 26 is movable between the first predetermined position K1 and the second predetermined position K2, in order to increase supporting stability between the first rail 22 and the second rail 24, and improve reliability of the predetermined structure 72 working with the working member 70, so as to ensure that the synchronous movement configuration between the second rail 24 and the first rail 22 operates normally.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
   a first rail formed with a passage;
   a second rail longitudinally movable relative to the first rail; and
   a slide assisting device movably mounted between the first rail and the second rail, wherein the slide assisting device comprises a first side part, a second side part and a longitudinal part connected between the first side part and the second side part, wherein the slide assisting device further comprises a plurality of rolling members arranged on the first side part and the second side part, and a predetermined feature protruded from the longitudinal part;
   wherein one of the first rail and the slide assisting device is arranged with an elastic member having a first engaging feature, the other one of the first rail and the slide assisting device is arranged with a second engaging feature, and the first engaging feature and the second engaging feature are configured to be engaged with each other in order to prevent the slide assisting device from being moved from a first predetermined position along a retracting direction;
   wherein the second rail comprises an auxiliary part and a driving part;
   wherein when the second rail detached from the passage of the first rail is reinserted into the passage of the first rail along the retracting direction, the second rail is configured to contact the elastic member through the auxiliary part, in order to move the elastic member to switch from a first state to a second state, so as to disengage the first engaging feature and the second engaging feature from each other; and when the second rail is further moved along the retracting direction, the driving part is configured to contact the protruded predetermined feature on the slide assisting device, in order to drive the slide assisting device to move with the second rail along the retracting direction to be away from the first predetermined position.

2. The slide rail assembly of claim 1, wherein the slide assisting device is located inside the passage of the first rail.

3. The slide rail assembly of claim 2, wherein the plurality of rolling members are configured to provide support between the first rail and the second rail.

4. The slide rail assembly of claim 3, wherein each of the first rail and the second rail comprises a first wall, a second wall and a longitudinal wall connected between the first wall and the second wall; wherein the plurality of rolling members are configured to provide support between the first wall of the first rail and the first wall of the second rail, and configured to provide support between the second wall of the first rail and the second wall of the second rail.

5. The slide rail assembly of claim 3, wherein the first rail has a first end part and a second end part opposite to each other; wherein when the slide assisting device is located at the first predetermined position, the slide assisting device is adjacent to the first end part of the first rail.

6. The slide rail assembly of claim 5, wherein when the slide assisting device is moved from the first predetermined position along the retracting direction to a second predetermined position, the slide assisting device is adjacent to the second end part of the first rail.

7. A slide rail assembly, comprising:

a first rail formed with a passage;

a second rail; and a slide assisting device located inside the passage of the first rail, wherein the slide assisting device comprises a first side part, a second side part and a longitudinal part connected between the first side part and the second side part, wherein the slide assisting device further comprises a plurality of rolling members arranged on the first side part and the second side part, and a predetermined feature protruded from the longitudinal part;

wherein one of the first rail and the slide assisting device is arranged with an elastic member having a first engaging feature, the other one of the first rail and the slide assisting device is arranged with a second engaging feature, and the first engaging feature and the second engaging feature are configured to be engaged with each other in order to prevent the slide assisting device from being moved from a first predetermined position along a retracting direction;

wherein the second rail comprises an auxiliary part and a driving part;

wherein when the second rail is inserted into the passage of the first rail from outside of the passage of the first rail along the retracting direction, the second rail is configured to contact the elastic member through the auxiliary part, in order to move the elastic member to switch from a first state to a second state, so as to disengage the first engaging feature and the second engaging feature from each other; and when the second rail is further moved along the retracting direction, the driving part is configured to contact the protruded predetermined feature on the slide assisting device, in order to drive the slide assisting device to move with the second rail along the retracting direction to be away from the first predetermined position;

wherein the slide rail assembly further comprises a third rail, and the first rail is movably mounted between the third rail and the second rail;

wherein the slide rail assembly further comprises a working member arranged on the first rail, and a predetermined structure is arranged on the second rail; during a process of the second rail being moved relative to the first rail from a retracted position along an opening direction, the working member and the predetermined structure are configured to be engaged with each other, such that the first rail is configured to be synchronously moved with the second rail relative to the third rail along the opening direction.

8. The slide rail assembly of claim 7, wherein the plurality of rolling members are configured to provide support between the first rail and the second rail.

9. The slide rail assembly of claim 8, wherein each of the first rail and the second rail comprises a first wall, a second wall and a longitudinal wall connected between the first wall and the second wall; wherein the plurality of rolling members are configured to provide support between the first wall of the first rail and the first wall of the second rail, and configured to provide support between the second wall of the first rail and the second wall of the second rail.

10. The slide rail assembly of claim 8, wherein the first rail has a first end part and a second end part opposite to each other; wherein when the slide assisting device is located at the first predetermined position, the slide assisting device is adjacent to the first end part of the first rail.

11. The slide rail assembly of claim 10, wherein when the slide assisting device is moved from the first predetermined position along the retracting direction to a second predetermined position, the slide assisting device is adjacent to the second end part of the first rail.

12. The slide rail assembly of claim 7, wherein the third rail is an outer rail, the first rail is a middle rail, and the second rail is an inner rail.

13. The slide rail assembly of claim 12, wherein the working member is pivotally connected to the first rail through a shaft member, and the working member comprises a working part; wherein the predetermined structure is formed with a space configured to accommodate the working part of the working member.

14. The slide rail assembly of claim 13, wherein the shaft member is arranged in a direction substantially identical to a transverse direction of the first rail.

15. The slide rail assembly of claim 13, further comprising an elastic feature configured to provide an elastic force to the working member.

16. A slide rail assembly, comprising:

a first rail formed with a passage;

a second rail; and a slide assisting device located inside the passage of the first rail;

wherein one of the first rail and the slide assisting device is arranged with an elastic member having a first engaging feature, the other one of the first rail and the slide assisting device is arranged with a second engaging feature, and the first engaging feature and the second engaging feature are configured to be engaged with each other in order to prevent the slide assisting device from being moved from a first predetermined position along a retracting direction;

wherein the second rail comprises an auxiliary part and a driving part;

wherein when the second rail is inserted into the passage of the first rail from outside of the passage of the first rail along the retracting direction, the second rail is configured to contact the elastic member through the auxiliary part, in order to move the elastic member to switch from a first state to a second state, so as to disengage the first engaging feature and the second engaging feature from each other; and when the second rail is further moved along the retracting direction, the driving part is configured to contact a predetermined feature on the slide assisting device, in order to drive the slide assisting device to move away from the first predetermined position along the retracting direction;

wherein the slide rail assembly further comprises a third rail, and the first rail is movably mounted between the third rail and the second rail;

wherein the slide rail assembly further comprises a working member arranged on the first rail, and a predetermined structure is arranged on the second rail; during a process of the second rail being moved relative to the first rail from a retracted position along an opening direction, the working member and the predetermined structure are configured to be engaged with each other, such that the first rail is configured to be synchronously moved with the second rail relative to the third rail along the opening direction;

wherein the third rail is an outer rail, the first rail is a middle rail, and the second rail is an inner rail;

wherein the working member is pivotally connected to the first rail through a shaft member, and the working member comprises a working part; wherein the predetermined structure is formed with a space configured to accommodate the working part of the working member.

*    *    *    *    *